(12) United States Patent
Thursby et al.

(10) Patent No.: US 10,135,489 B2
(45) Date of Patent: Nov. 20, 2018

(54) MULTI-STAGE EQUALISATION METHOD AND APPARATUS FOR USE IN TELEMETRY

(71) Applicant: E.V. Offshore Limited, Norwich (GB)

(72) Inventors: Jonathan Thursby, Norwich Norfolk (GB); Sumanth Eadala, Norwich (GB); Jonathan Brian Rudd, Norfolk (GB)

(73) Assignee: E.V. Offshore Limited (GB)

( * ) Notice: Subject to any disclaimer, the term of this patent is extended or adjusted under 35 U.S.C. 154(b) by 0 days.

(21) Appl. No.: 15/446,444

(22) Filed: Mar. 1, 2017

(65) Prior Publication Data

US 2017/0272120 A1 Sep. 21, 2017

Related U.S. Application Data

(63) Continuation of application No. 14/769,695, filed as application No. PCT/IB2014/059346 on Feb. 28, 2014, now Pat. No. 9,621,223.

(30) Foreign Application Priority Data

Feb. 28, 2013 (GB) .................................. 1303624.9

(51) Int. Cl.
*H04B 3/14* (2006.01)
*H04B 3/54* (2006.01)
(Continued)

(52) U.S. Cl.
CPC ............. *H04B 3/148* (2013.01); *H04B 3/542* (2013.01); *H04B 3/544* (2013.01); *H04L 25/03133* (2013.01); *H04L 25/03878* (2013.01); *E21B 47/12* (2013.01); *H04B 3/145* (2013.01); *H04B 2203/5458* (2013.01); *H04B 2203/5475* (2013.01)

(58) Field of Classification Search
CPC ..................... E21B 47/12; H04B 2203/5475
See application file for complete search history.

(56) References Cited

U.S. PATENT DOCUMENTS 5,473,321 A * 12/1995 Goodman ............... E21B 47/12
175/40
7,787,525 B1 * 8/2010 Clark, Jr. ............. E21B 47/122
340/855.4

(Continued)

FOREIGN PATENT DOCUMENTS

GB 2451079 A 1/2009

*Primary Examiner* — Ross Varndell
(74) *Attorney, Agent, or Firm* — Hayes Soloway PC (57) ABSTRACT

An inspection apparatus for use in wellbores in the oil and gas industries relates in general to the field of transmission of data between downhole module in a wellbore and a controlling module at the surface. The invention provides a method and apparatus for determining analog filter parameters for an analog front end comprising a plurality of filter stages receiving signals from a telemetry module, by repeating the steps of; receiving a signal of a known frequency and processing said signal by determining the magnitude of the frequency of the received signal until a plurality of signals have been received and processed; calculating an optimum set of filter parameters in dependence upon the measured frequency magnitudes and a predefined set of filter stage frequency responses.

16 Claims, 9 Drawing Sheets

(51) Int. Cl.
*H04L 25/03* (2006.01)
*E21B 47/12* (2012.01)

(56) References Cited

U.S. PATENT DOCUMENTS

| | | |
|---|---|---|
| 2006/0182171 A1 | 8/2006 | Kuijk et al. |
| 2010/0073190 A1* | 3/2010 | Fanini .................... E21B 47/12 340/855.7 |
| 2011/0205080 A1 | 8/2011 | Millot et al. |
| 2012/0243597 A1 | 9/2012 | Currivan et al. |
| 2012/0250461 A1* | 10/2012 | Millot .................... E21B 47/16 367/82 |
| 2013/0176139 A1* | 7/2013 | Chau ....................... G01V 3/30 340/854.4 |

* cited by examiner

FIG. 7b example of 16point QAM

FIG. 7d example of 64 point QAM

FIG. 7a example of 8 point QAM

FIG. 7c example of 32 point QAM

MULTI-STAGE EQUALISATION METHOD AND APPARATUS FOR USE IN TELEMETRY

CROSS REFERENCE TO RELATED APPLICATIONS

This application is a continuation of co-pending U.S. patent application Ser. No. 14/769,695, filed Aug. 21, 2015, which itself is a 371 of International Application Serial No. of PCT/IB2014/059346, filed Feb. 28, 2014, which claims priority of United Kingdom Patent Application No. 1303624.9, filed Feb. 28, 2013, each of which this application claims benefit from and the contents of which are hereby incorporated by reference.

BACKGROUND a. Field of the Invention

The present invention relates to inspection apparatus for use in wellbores in the oil and gas industries. In particular the invention relates in general to the field of transmission of data between downhole module in a wellbore and a controlling module at the surface.

b. Related Art

Accurate collection of geophysical data is a key to successful exploration and production in oil and gas industries. Based on data collected in a wellbore it is possible to determine whether a well is likely to be productive, and decisions can be made such as whether to drill additional wells near an existing well or whether to abandon a well as being unproductive.

Collecting wellbore data is known as well-logging. In well-logging, a telemetry module is lowered into a wellbore on a cable containing an inner core of insulated wire known as a wireline cable. The wireline cable provides power to equipment located at the end of the cable, and provides a pathway for electrical telemetry for communication between the surface and the telemetry module at the end of the cable.

The telemetry module is an electrically powered measurement device for inspecting the wellbore and is connected to a surface controller via the wireline cable.

Electrical digital and data control signals are transmitted between the surface controller and the downhole telemetry module via one or more conductors in the wireline cable. Downstream data signals are used to remotely control the functions of various downhole devices such as one or more cameras, motor tools to rotate a part of the module and to configure parameters for sensors such as temperature & pressure sensors, accelerometers and gyroscopes.

Upstream data signals transmit information from the telemetry module to the controller such as images, information indicative of the operation of the downhole devices or parameters detected or measured by the sensors.

The wellbore depth and hence the distance between the telemetry module and the surface controller may be many thousands of feet. Temperatures in the wellbore may rise to over 100 degrees Centigrade. The wireline cable must be designed to withstand the physical conditions and to sustain the weight of the telemetry module complete with tools connected beneath it and the length of the wireline cable as the telemetry module is lowered into the wellbore. The wireline cable is not primarily designed as a communications channel for efficiently transmitting modulated data signals and therefore the channel frequency response of the cable is not optimised for efficient data transmission.

Modulated data signals require synchronisation between the transmitter and receiver clocks in order to code and decode the data signal effectively. One problem with high temperature operation is that clock drift and hence synchronisation becomes more of an issue. Clocks usually vary by up to 10 ppm but at temperatures of 125° C. this can raise to 25-50 ppm. Also the signal attenuation at high frequency is much greater that at low frequencies.

The varying length of the wireline cable as the telemetry module is raised and lowered makes it difficult to match to channel frequency response of the communication link between the telemetry module and the surface controller. U.S. Pat. No. 5,473,321 discloses a telemetry system employing a periodic pseudo random sequence to effectively initialise an adaptive digital finite impulse response filter equaliser for optimising communications between a surface modem and downhole measuring equipment.

The present invention uses a novel adaptive filtering technique to match the channel frequency response on the link.

SUMMARY OF THE INVENTION

The invention provides a method and apparatus for initialising a surface modem comprising a controller coupled to an analogue front end comprising a plurality of filter stages for receiving signals from a telemetry module, the method comprising the steps of: repeating the steps of receiving a signal of a known frequency and processing said signal by determining the magnitude of the frequency of the received signal; until a plurality of signals have been received and processed; calculating an optimum set of filter parameters in dependence upon the measured frequency magnitudes and a predefined set of filter stage frequency responses and setting the filter parameters of the analogue front end to said set of optimum filter parameters.

Preferably the optimum set of filter parameters are determined by: for each of a set of filter parameters and each of a predetermined frequency; determining an observed frequency response in dependence upon the magnitude of the frequency of the observed signal and determining a resulting frequency response in dependence upon the observed frequency response and a cumulative filter frequency response; for each of a set of filter parameters determining a measure of variation in the resulting frequency responses for a set of frequencies selecting as the optimum filter parameters the set of filter parameters with the lowest measure of variation.

In one embodiment the set of filter parameters comprise a parameter associated with each stage and in which the filter response of each stage is stored in a look up table and in which the cumulative filter frequency response for the set of filter parameters is determined by accumulating the filter frequency response for each stage determined in accordance with the parameter associated with said stage.

Preferably the measure of variation is a standard deviation.

Preferably if the magnitude of the frequency of the received signal is less than a predetermined minimum the method further comprises the steps of applying a gain to the received signal and reprocessing the signal to determine the magnitude of the frequency.

In one embodiment the magnitude of the frequency of the received signal is determined by performing a Fast Fourier Transform.

Preferably the bandwidth is adjusted prior to entering autotune mode.

BRIEF DESCRIPTION OF THE DRAWINGS

The invention will now be described, by way of example only, with reference to the accompanying drawings in which.

DETAILED DESCRIPTION

Figure 1:
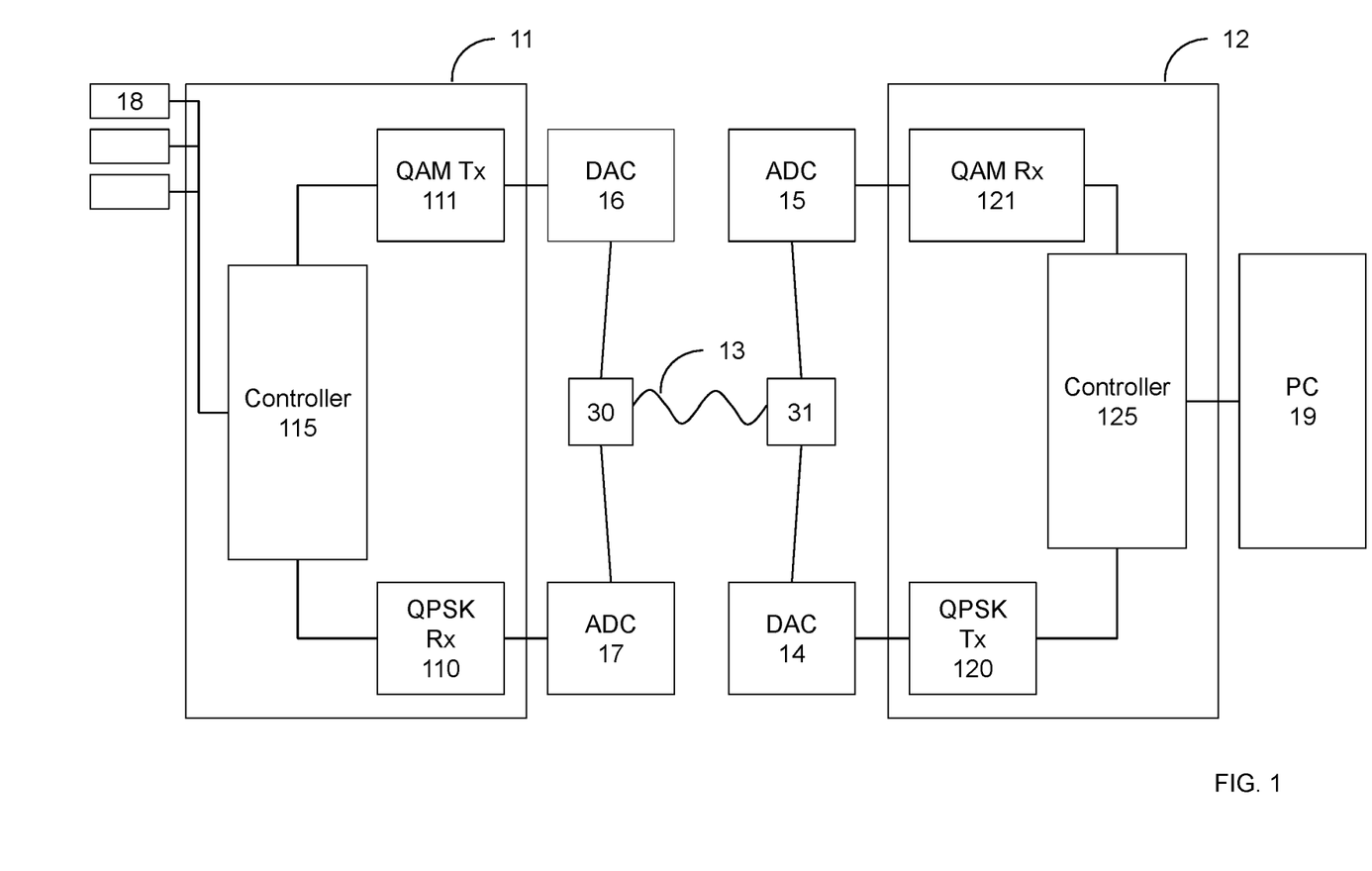
FIG. 1 is a block diagram illustrating a telemetry module and a surface controller connected via a wireline cable.

Referring now to FIG. 1 a telemetry module 11 is connected to a surface controller 12 via a wireline cable 13. Data is sent from the controller to the module via a quadrature phase shift keying (QPSK) link. Data is sent from the module to the controller via a quadrature amplitude modulation (QAM) link. Controller 12 is connected to a computer 19 which is used to send commands to the controller 12 for controlling the various downhole devices such as one or more cameras, motor tools to rotate a part of the module and to configure parameters of sensors such as temperature sensors, pressure sensors, gyroscopes and accelerometers.

The surface controller 12 has a QPSK transmitter 120 and a QAM receiver 121. Downstream communication from the controller to the telemetry module is a low data rate (1000 baud) and is sent over the QPSK link by the QPSK transmitter 120. A digital signal from the QPSK transmitter 120 is converted to an analogue signal by a digital to analogue converter 14 for transmission via the wireline cable 13.

Upstream signals received from the telemetry unit to the controller are converted to a digital QAM signal by analogue to digital converter 15 and received by the QAM receiver 121 via an analogue adaptive equaliser 123 which will be described later with reference to FIG. 3

For example commands may be sent to the telemetry module to control the resolution and frame rate of images sent by cameras, or the compression ratio of the image data. A high frame rate may be compensated by a lower resolution and vice versa. Commands may also be used to switch between camera data feeds where there is more than one camera. Alternatively, two streams may be sent simultaneously, alternating between cameras resulting in a lower frame rate and/or lower resolution in each stream. Commands may also be used to control the lighting or the rotation of the inspection apparatus.

The telemetry module 11 has a QAM transmitter 111 and a QPSK receiver 110. Upstream communication from the telemetry module to the surface controller is video data (encoded using H264/MPEG-4), along with telemetry data at a total data rate of 200 Kbits/s and is sent over the QAM link by the QAM transmitter 111. A digital signal from the QAM transmitter is converted to an analogue signal by a digital to analogue converter 16 for transmission via the wireline cable 13.

Downstream signals from the controller to the telemetry unit are converted to a digital QPSK signal by analogue to digital converter 17 and are received by the QPSK receiver 110.

The telemetry module is powered via the wireline cable 13 (also known as E-line) using a proprietary power line communication protocol. The surface controller 12 receives sensor data from sensors 18, which may include temperature data, and voltage and current data from the telemetry module 11. The sensor data is sent via the QAM receiver 121 to the controller 125. In response the controller 125 adapts the power transmitted to the module in order to decrease the temperature and/or increase the cooling when necessary.

Controller 125 continually monitors voltage/current feedback via telemetry data fed back from controller 115 and adjusts the voltage to optimise the load and thus limit heat generation within power supply of downhole telemetry module 11.

Figure 2:
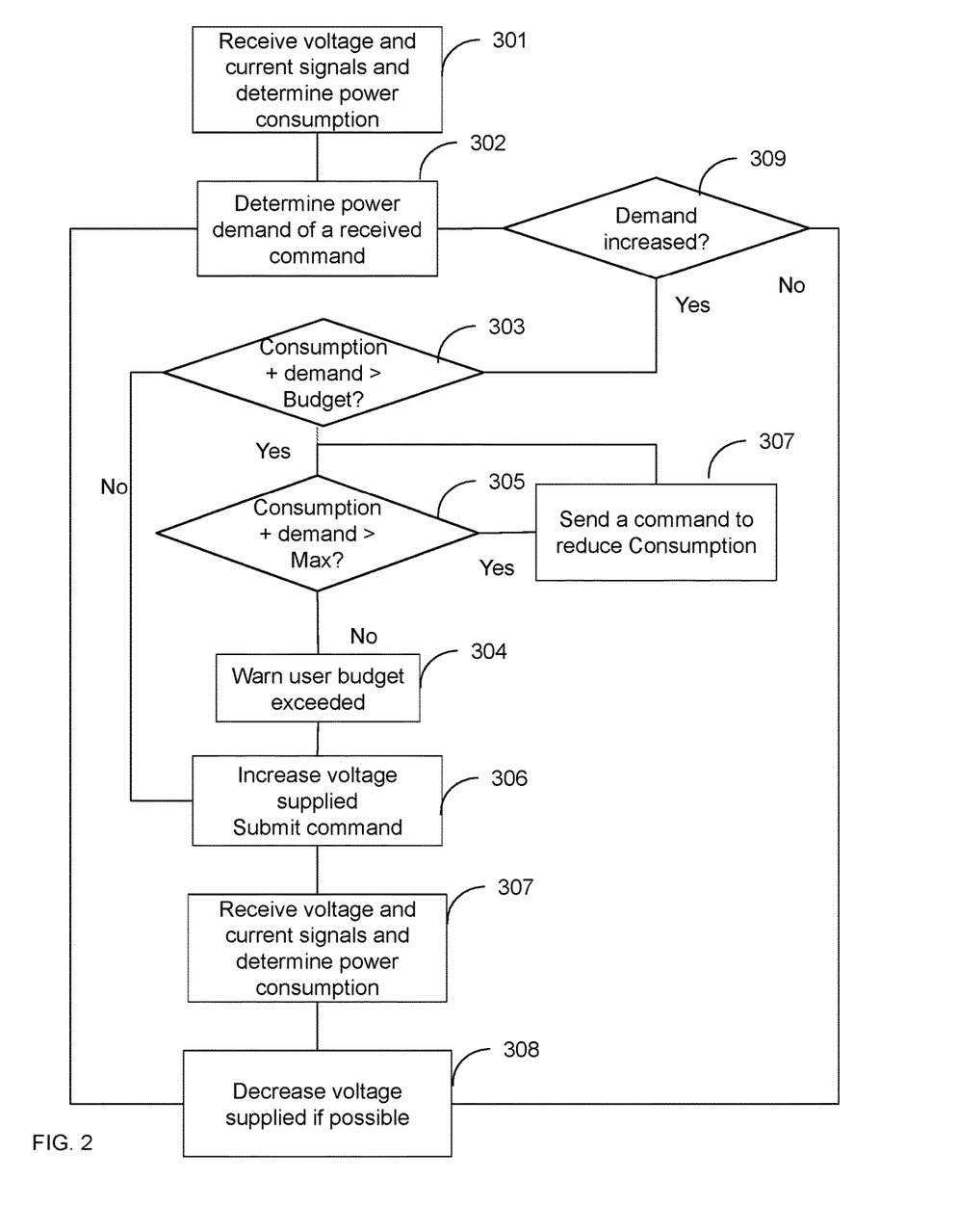
FIG. 2 is a flow chart illustrating power optimisation according the present invention.

FIG. 2 is a flow chart illustrating a power optimisation system according to the present invention.

At step 301 the surface controller 125 receives voltage and current signals from the telemetry unit controller 115 and determines the power consumption A total power budget is predetermined for the system. Before a control message is sent from Controller 125 to Controller 115, the power demand likely to be caused by execution of the command is determined at step 302

If it will cause more power demand at step 309 e.g. increase camera light level, rotate motor then if the power consumption plus the anticipated demand is less that the predetermined budget at step 303, then the Controller 125 increases the voltage, (to slightly more than the anticipated demand) at step 306, within the total budget to allow for the new demand, the controller 125 then waits for a short time for the signals to settle and then submits the command message to controller 115 which performs the requested function.

The budget can be exceeded resulting in additional heat being dissipated in the telemetry unit 11, but only up to a maximum physical limit which depends upon the resistance of the cable and the power supply unit capabilities.

If the power consumption plus the anticipated demand is less than (or equal to) the physical maximum at step 305, then the user of system is warned at step 304 and should try to execute one or more commands to reduce the demand as soon as possible, for example the user may choose to lower the light levels.

If the power consumption plus the anticipated demand is greater than that the physical maximum at step 305, then a command is sent to reduce consumption, for example, a command may be sent to turn lights down if the desired command is to send a command to rotate a camera.

The power will reset after the function is complete (i.e. motor rotation) or light levels set to lower level etc. This happens after the next volt/current telemetry data is received at step 307 when the power supplied will be reduced if the consumption has fallen.

In addition, feedback from one or more temperature sensors 18 is used within the telemetry tool to control active cooling to further reduce the temperature. Temperature data is also sent to controller 125 which can be used to further optimise the power load.

A problem with communications via the E-line is that the channel frequency response (CFR) (due to the capacitance and resistance) of the cable varies with the quality of the cable, with the overall length of the cable and also as the cable unrolls.

The analogue front end (AFE) 31 at the surface end of the E-line connector 13 provides adaptive filtering. The AFE 31 provides an analogue adaptive filter 123 and an FPGA in the controller 125 provides a digital adaptive filter to provide rapid equalisation to match the CFR. It is possible to control the analogue filters manually, the digital adaptive filter adapts automatically. In the present invention known data is sent from the telemetry module 11 to the controller 12 in order to allow the analogue filters to adjust automatically, this process is known as autotuning.

Figure 3:
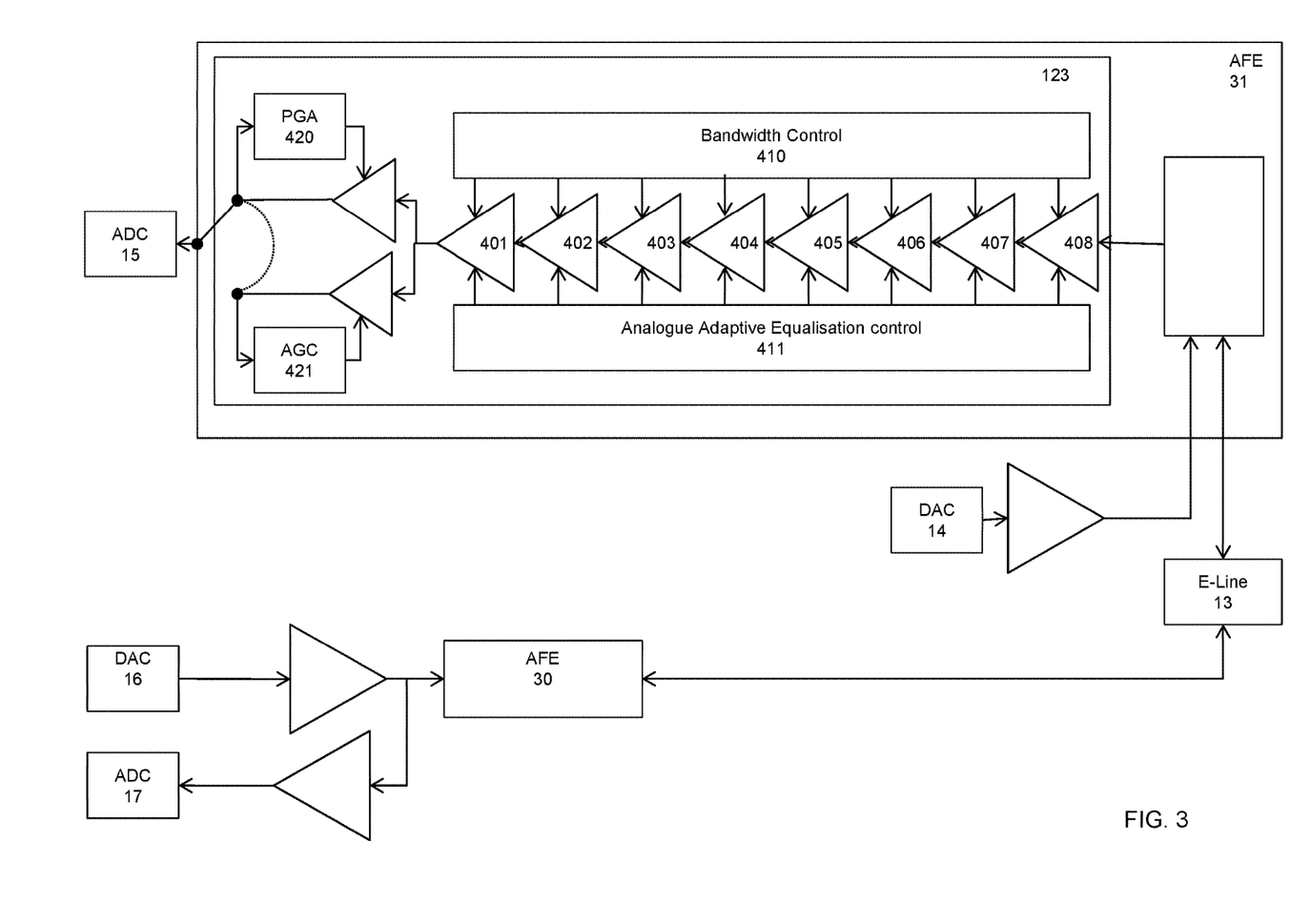
FIG. 3 is a block diagram showing an analogue adaptive equaliser for use in the present invention.

The analogue adaptive filter 123 is shown in more detail in FIG. 3.

The analogue adaptive filter 123 comprises a number of filter stages 401 . . . 408 which each of which can have a bandwidth and gain set via the bandwidth control module 410 and the analogue adaptive equalisation control module 411.

The QAM ADC 15 switches between receiving the signal via a programmable gain amplifier (PGA) circuit 420 and an automatic gain control (AGC) 421 circuit depending upon whether the circuit is in normal or tuning mode.

To optimise the AFE filter stages 401 . . . 408 to achieve the best channel frequency response, a tuning sequence can be carried out at any time. In the following description the terms filter setting and filter parameters are used interchangeably.

Figure 4:
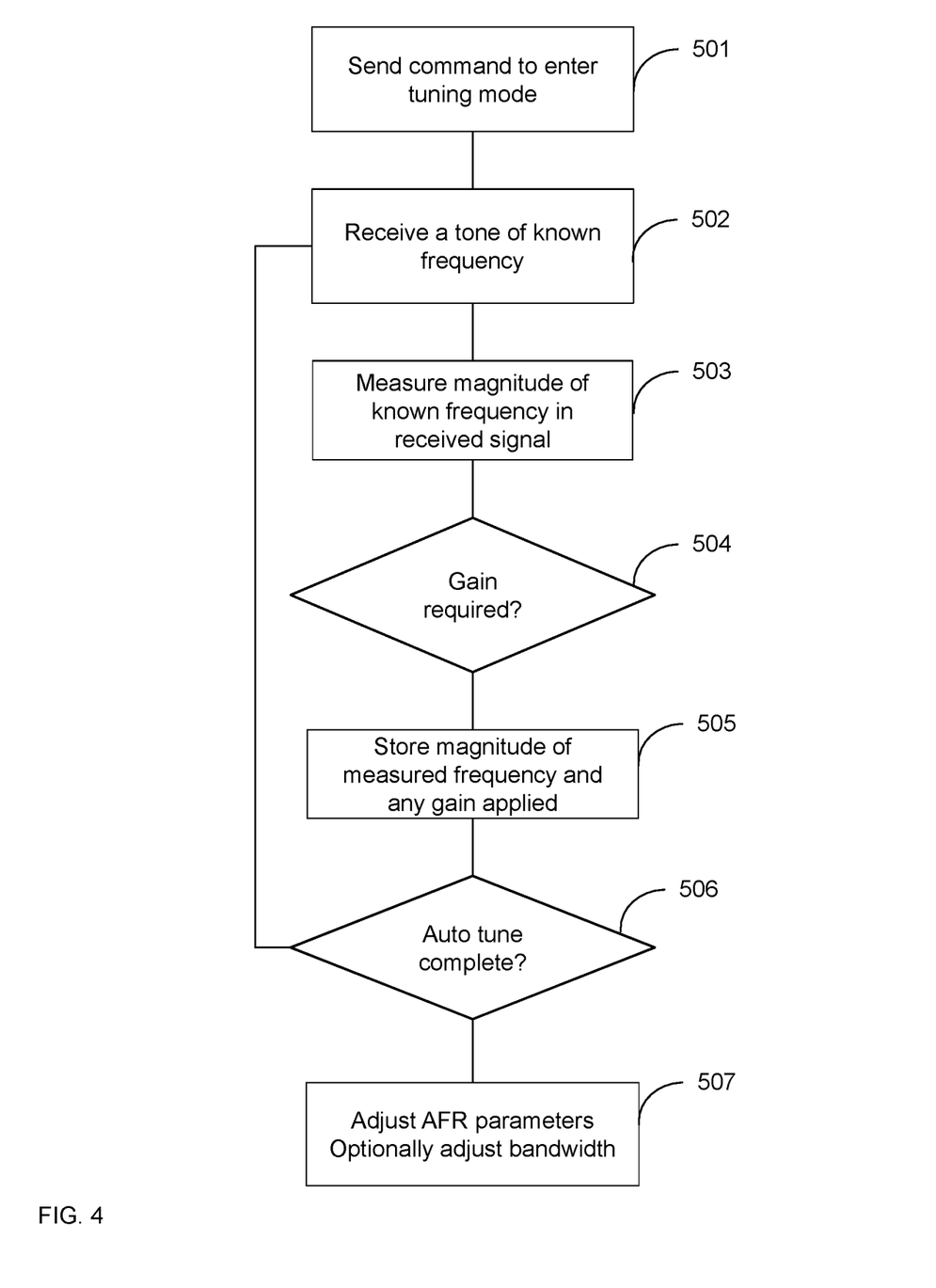
FIG. 4 is a flow chart illustrating an autotuning process.

Referring now to FIG. 4, the controller 125 sends a command to controller 115 to enter tuning mode at step 501. Controller 125 then sends commands to controller 115 to cause telemetry controller 115 to transmit a tone of known frequency to surface module controller 125. Controller 125 receives the signal at step 502, samples the received signal and applies a Fast Fourier transform (FFT) to determine the magnitude of the known frequency in the received signal at step 503. If the mean frequency magnitude is less than a predetermined threshold the PGA (Programmable Gain Amplifier) gain is adjusted to increase the signal amplitude. The gain to be applied is determined by indexing a preset PGA table.

The magnitude of the frequency and gain applied are stored in a results table at step 505. This sequence is repeated for different frequencies across a desired channel bandwidth range. At step 507 the stored results are used to determine analogue filter settings to be applied by the analogue adaptive equalisation control module 411 for each filter stage.

A filter stage's frequency response can be controlled by Controller 125. The controller 125 calculates the optimum settings for the stage to achieve the closest response match from the frequency and gain values stored. This results in the optimum CFR for the system.

Each filter stage 401 . . . 408 is controlled by switches which switch in and out banks of capacitance to alter the frequency response of that stage.

The frequency response for each switch setting is precalculated and stored in a lookup table, for example the table below shows the precalculated frequency response table for filter stages 401 to 406. The frequency response figures are shown in dB so the cumulative filter frequency response from a sequence of stages may be determined by summing the values shown in the relevant tables.

In an alternative embodiment the cumulative filter frequency response from a sequence of stages may be precalculated and stored in a table resulting in higher memory usage but less processing time.

| | BIN | | | | | | | |
|---|---|---|---|---|---|---|---|---|
| kHz | 000 | 001 | 010 | 011 | 100 | 101 | 110 | 111 |
| 10 | 0.0000 | 0.2897 | 0.1090 | 0.5296 | 0.0470 | 0.4109 | 0.1935 | 0.6786 |
| 15 | 0.0000 | 0.6253 | 0.2446 | 1.1060 | 0.1093 | 0.8701 | 0.4258 | 1.3870 |
| 20 | 0.0000 | 1.0402 | 0.4107 | 1.7849 | 0.1861 | 1.4200 | 0.7126 | 2.1965 |
| 25 | 0.0000 | 1.5052 | 0.6115 | 2.4933 | 0.2798 | 2.0176 | 1.0470 | 3.0240 |
| 30 | 0.0000 | 1.9986 | 0.8456 | 3.2099 | 0.3923 | 2.6322 | 1.4177 | 3.8374 |
| 35 | 0.0000 | 2.4901 | 1.0849 | 3.8897 | 0.5092 | 3.2309 | 1.7876 | 4.5985 |
| 40 | 0.0000 | 2.9723 | 1.3364 | 4.5335 | 0.6386 | 3.8018 | 2.1663 | 5.2993 |
| 45 | 0.0000 | 3.4314 | 1.5885 | 5.1272 | 0.7662 | 4.3450 | 2.5365 | 5.9414 |
| 50 | 0.0000 | 3.8708 | 1.8395 | 5.6772 | 0.9004 | 4.8459 | 2.8936 | 6.5300 |
| 55 | 0.0000 | 4.2797 | 2.0805 | 6.1765 | 1.0343 | 5.3099 | 3.2338 | 7.0652 |
| 60 | 0.0000 | 4.6568 | 2.3165 | 6.6352 | 1.1657 | 5.7342 | 3.5543 | 7.5438 |
| 65 | 0.0000 | 5.0149 | 2.5438 | 7.0588 | 1.2980 | 6.1302 | 3.8588 | 7.9900 |
| 70 | 0.0000 | 5.3383 | 2.7543 | 7.4359 | 1.4200 | 6.4890 | 4.1394 | 8.3870 |
| 75 | 0.0000 | 5.6432 | 2.9601 | 7.7857 | 1.5433 | 6.8193 | 4.4023 | 8.7479 |
| 80 | 0.0000 | 5.9223 | 3.1475 | 8.1027 | 1.6577 | 7.1218 | 4.6466 | 9.0794 |
| 85 | 0.0000 | 6.1761 | 3.3263 | 8.3916 | 1.7656 | 7.3956 | 4.8720 | 9.3800 |
| 90 | 0.0000 | 6.4175 | 3.4976 | 8.6584 | 1.8742 | 7.6541 | 5.0858 | 9.6590 |

For all possible combinations of filter switch settings and frequencies, the cumulative filter frequency response is added to the observed frequency response and stored in a results table.

Figure 5:
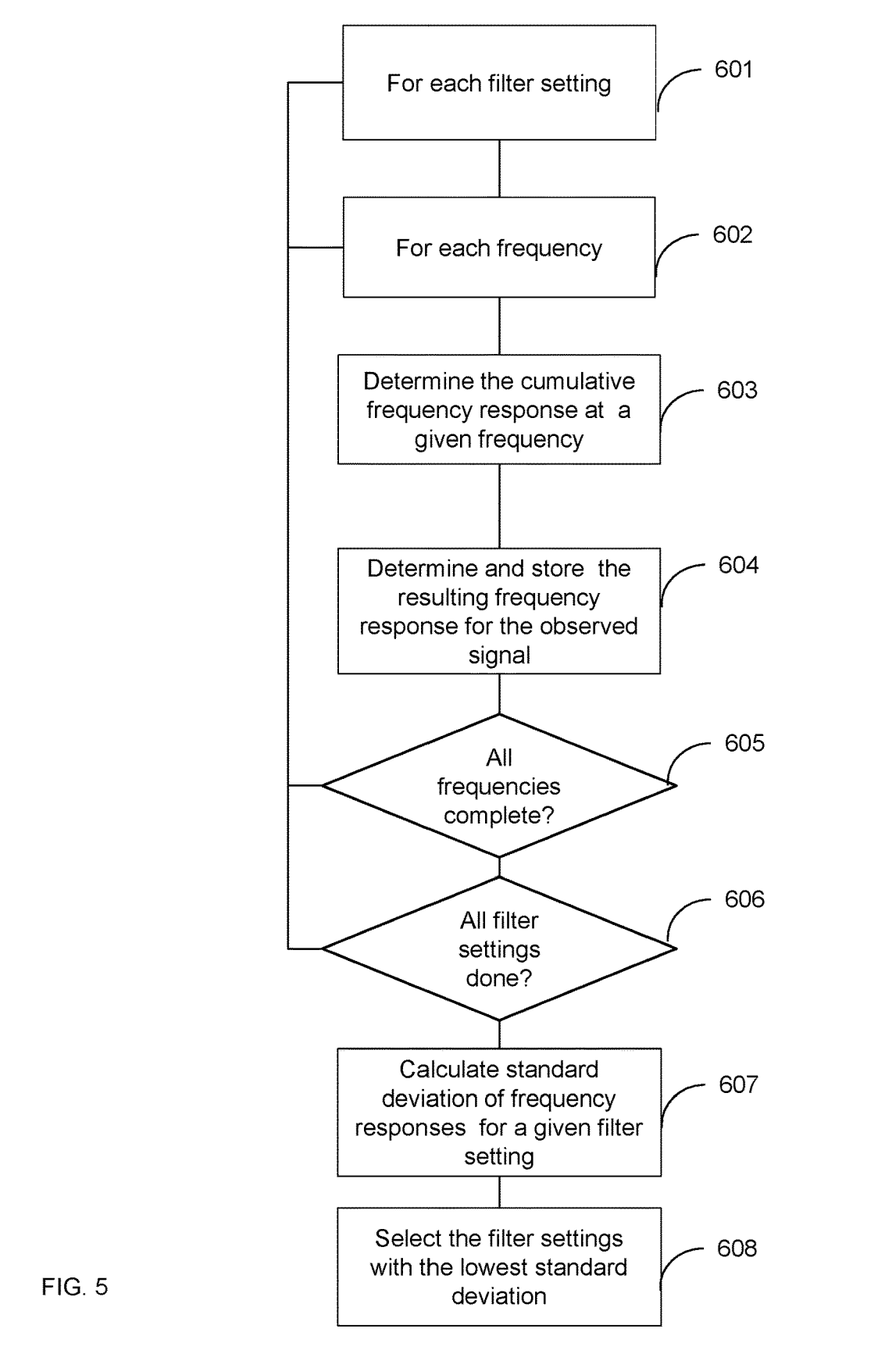
FIG. 5 is a flow chart illustrating a method of determining optimum parameters.

An exemplary implementation of this is shown in FIG. 5 where each filter setting is selected in turn at step 601, each frequency is selected in turn at step 602. The cumulative filter frequency response of the filter settings selected is calculated at step 603 by summing the responses of each stage. The resulting response is determined at step 604 by adding the observed frequency response to the cumulative filter frequency response and stored in a results table for processing.

In the embodiment shown filter stages 1 to 6 are controlled by three switches, filter stage 7 is controlled by two switches and filter stage 8 is controlled by four switches. A 24 bit value representing the setting for all 8 stages may conveniently be represented as a 6 hexadecimal digits.

So, for example, if the observed frequency response at 10 KHz is 56.5341 dB and the cumulative filter frequency response for filter stage setting 456DB6 (binary 0100 0101 0110 1101 1011 0110) is 1.3397 dB then the resulting frequency response determined and stored in the results table at step 604 for 10 KHz would be 57.8738.

An example of a data from the results table after each resulting frequency response has been determined for filter setting 456DB6 might be:

| | kHz | | | | | | | |
|---|---|---|---|---|---|---|---|---|
| HEX | 10 | 15 | 20 | 25 | 30 | 35 | 40 | 45 | 50 |
| 456DB6 | 57.8738 | 56.7738 | 54.2734 | 57.3562 | 53.8741 | 54.8778 | 57.8596 | 57.8733 | 54.8732 |

| | kHz | | | | | | | |
|---|---|---|---|---|---|---|---|---|
| HEX | 55 | 60 | 65 | 70 | 75 | 80 | 85 | 90 |
| 456DB6 | 55.6777 | 55.4432 | 56.8768 | 56.8763 | 54.5768 | 57.8768 | 58.8778 | 59.8878 |

Once the resulting frequency responses for all possible filter settings at each of the predetermined frequencies have been calculated and stored, a standard deviation of the resulting frequency responses for a given setting is determined at step 607 (in the above example the standard deviation is 1.73699) to measure the variability of the responses across the frequency range. It is desirable to select the filter settings giving the least variable or 'flattest' response.

The filter settings providing the optimum response are determined at step 608 by selecting the filter setting having the lowest standard deviation in the resulting frequency responses.

Once the optimum filter settings are determined the filter parameters (ie the filter settings) of the analogue front end are set to said set of optimum filter parameters at step 507 (FIG. 4).

The controller 125 then sends command to 115 to stop tuning mode. The modem then re-initialises for data transmission.

Autotuning can be done automatically at tool power on to tune the AFE 31 to the cable in use or at any time by user request—to improve the channel frequency response, for example when several thousand feet of cable have been spooled out which can often alter the CFR, the AFE can be retuned.

The bandwidth of the AFE defaults to a fixed width. Depending upon the auto-tuning results the system can automatically increase the AFE filter bandwidth allowing the modem to provide higher data rates, for example, 300 Kbits/s.

When cable CFR is poor, the bandwidth may also be reduced to maintain reliable communication albeit at lower data rates.

Quadrature amplitude modulation (QAM) codes two digital bit streams, by modulating the amplitudes of two carrier waves. The two carrier waves, are usually sinusoidal and are out of phase with each other by 90°. The carrier waves are usually referred to as an 'inphase' and 'quadrature' carriers and the components are often referred to as the 'I' component and the 'Q' component respectively.

In digital QAM, a finite number of at least two phases and at least two amplitudes are used.

Figure 7A:
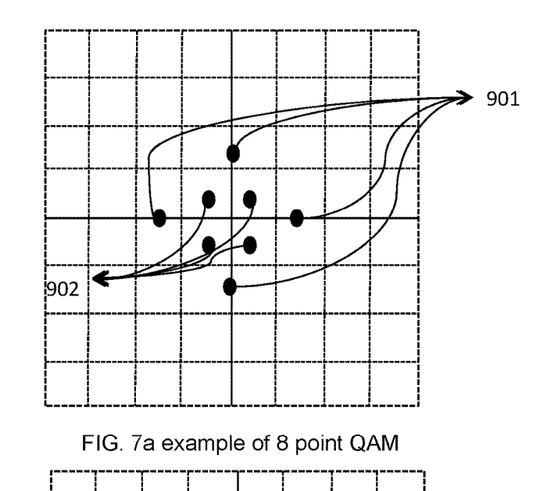
FIGS. 7a-7d are illustrations of QAM constellations.
Figure 7B:
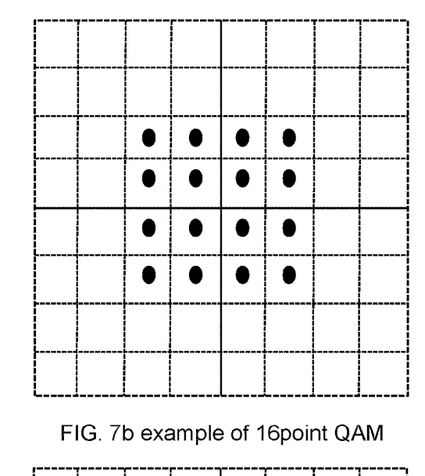
Figure 7C:
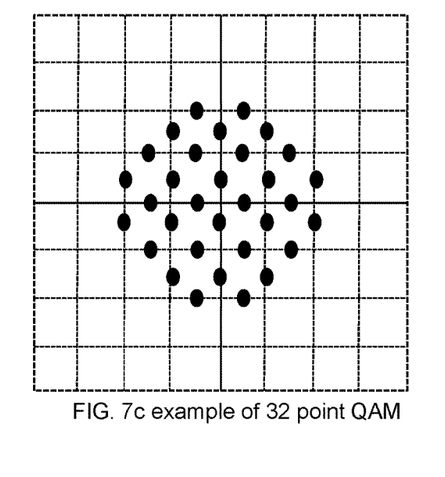
Figure 7D:
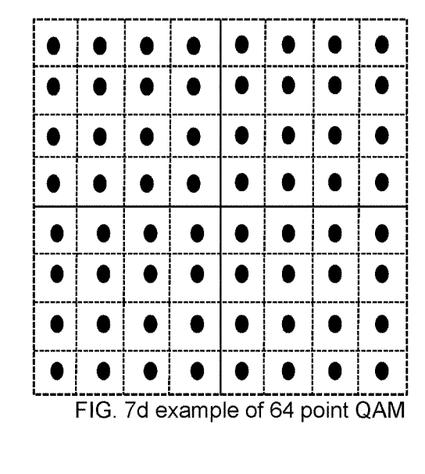

A useful representation of QAM modulation scheme is the constellation diagram which is a pictorial representation of a mapping showing how each symbol is coded by the inphase and quadrature carriers. Examples of constellation diagrams are shown in FIGS. 7a to 7d. In particular, FIG. 7a shows an example 8 point QAM constellation diagram, FIG. 7b shows an example 16 point QAM constellation diagram, FIG. 7c shows an example 32 point QAM constellation diagram, and FIG. 7d shows an example 64 point QAM constellation diagram.

Referring to FIGS. 7a to 7d it will be appreciated that the symbols represented by the 'outer' points in the constellation will have better signal to noise ratio than signals closer to the origin because those symbols are represented by carrier signals having a greater amplitude. For example symbols labelled 901 in FIG. 7a will have the greatest signal to noise ratio in 8 QAM.

Symbols represented by points on the axis of the constellation are represented by a pure sinusoidal signal (again points labelled 901 in FIG. 7a), signals represented by points on the diagonal will be represented by signals having equal inphase and quadrature components, these points are labelled 902 in FIG. 7a.

Upon reception of the signal, the demodulator examines the received symbol, which may have been corrupted by the channel or the receiver (e.g. additive white Gaussian noise, distortion, phase noise or interference). It selects, as its estimate of what was actually transmitted, that point on the constellation diagram which is closest (in a Euclidean distance sense) to that of the received symbol. Thus it will demodulate incorrectly if the corruption has caused the received symbol to move closer to another constellation point than the one transmitted.

High spectral efficiencies can be achieved with QAM by setting a suitable constellation size, limited only by the noise level and linearity of the communications channel.

On shorter cable lengths, with good CFR or longer cables with exceptional CFR. QAM32 or QAM64 encoding can be employed to increase the data rate without extending bandwidth. Higher rates are possible with extended bandwidth, e.g. 300 to 400 Kbits/s. This can be selected dynamically e.g. whilst tool is running and/or deployed.

Because the probe has to fit in relatively narrow pipelines, the telemetry module 11 is implemented on a circuit board with a max width of 30 mm to fit into the inspection apparatus. This means that the module must be designed to make the components as small as possible in order to fit within the necessary size limitations.

Figure 6:
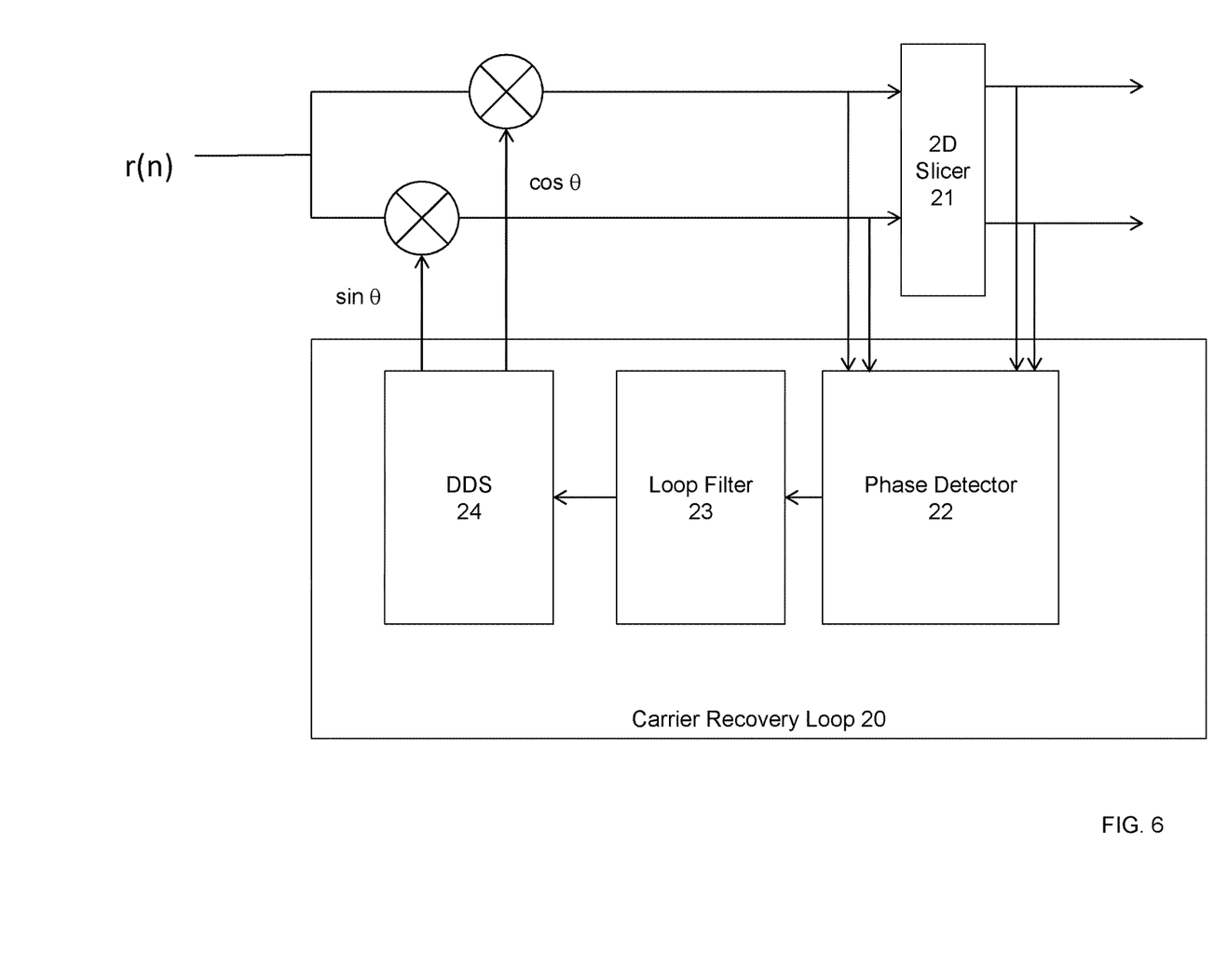
FIG. 6 is a block diagram of a quadrature amplitude modulation (QAM) receiver for use in a controller of the present invention.

The operation of the QAM receiver 121 will now be described in more detail with reference to FIG. 6 which illustrates schematically a QAM receiver. A carrier recovery loop 20 generates replicas of the QAM quadrature carriers.

The phase of these carriers must be synchronised with the received signal r(n).

Received signal r(n) is multiplied by quadrature carrier signals cos θ and sin θ to generate observed symbol values X(n) and Y(n). Slicer 21 maps the observed X(n) and Y(n) to the closest (in the Euclidean sense) constellation values I(n) and Q(n).

Phase detector 22 determines the phase difference between X(n),Y(n) and I(n),Q(n).

The phase difference detected is sent to a loop filter 23 and the output is then used to adjust the phase of the carrier signals generated by a direct digital synthesiser 24.

One method of determining the phase difference between two quadrature encoded signals is to determine the phase of each signal using the arctangent function and then calculate the difference between the two resulting phase angles. The arctangent function may be implemented by using a look up table, but this uses a large amount of memory. The present invention provides an improved technique for determining the phase error.

The complexity of the calculation may be reduced by using the fact that for small $\Delta\varphi$ the phase difference $\Delta\varphi(n)$ is proportional to $I(n)Y(n)-Q(n)X(n)$.

Figure 8:
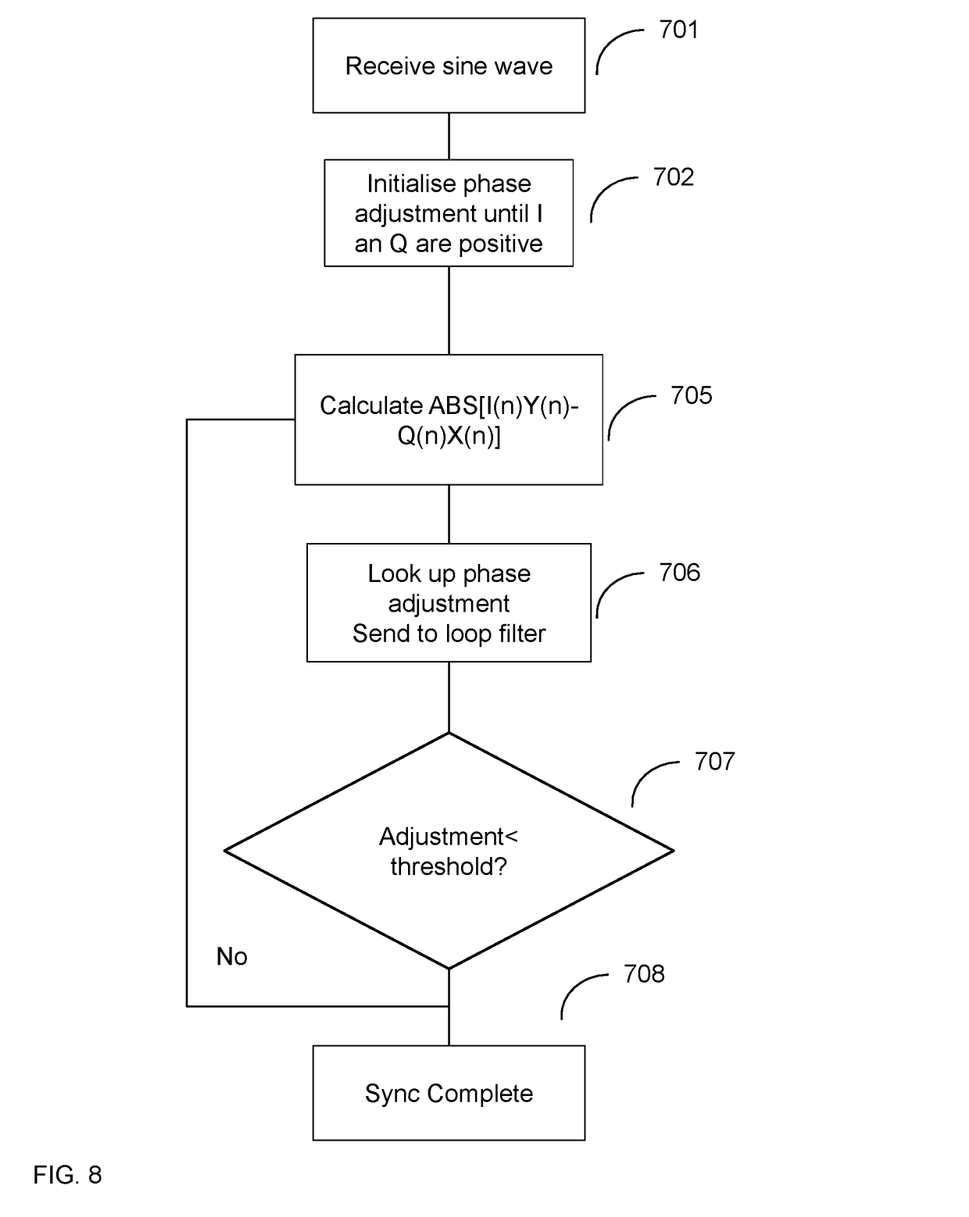
FIG. 8 is a flow chart illustrating a method used to lock to the phase of generated carrier signals to the phase of the received signal.

The method of achieving phase lock is illustrated in FIG. 8.

In the present invention a coarse phase lock is achieved by transmitting a sine wave, preferably representing a symbol having the greatest amplitude modulating components and therefore the greatest signal to noise ratio. In the preferred embodiment this signal represents a symbol lying in the first quadrant and represents a data stream of '1's.

The preamble is received by the surface module controller at step 701.

The phase error is calculated by phase detector 22 using the result of the above cross product calculation and accessing a lookup table (LUT) comprising 18 locations of 16 bit data.

The 18 memory locations in the LUT are used to determine the phase error from pre-calculated values of $I(n)Y(n)-Q(n)X(n)$.

Since we know that ideal symbol position (in first quadrant and in rightmost corner) then if the received symbol falls in any one of the other three quadrants (determined by the sign of the measured Symbols $X(n)$ and $Y(n)$) the signal is firstly coarsely phase adjusted by 90, 180 or 270 degrees respectively at step 702.

At step 705 the cross product $I(n)Y(n)-Q(n)X(n)$ is calculated. A phase adjustment is determined at step 706 using the LUT shown below using the value from the LUT which is closest to the cross product $I(n)Y(n)-Q(n)X(n)$.

| ABS[I(n)Y(n)-Q(n)X(n)] | Phase Error (Degrees) |
|---|---|
| 1080 | 0.5 |
| 2160 | 1 |
| 4080 | 2 |
| 6000 | 3 |
| 8160 | 4 |
| 9840 | 5 |
| 12000 | 6 |
| 14160 | 7 |
| 16080 | 8 |
| 18000 | 9 |
| 20160 | 10 |
| 29760 | 15 |
| 39360 | 20 |
| 48720 | 25 |
| 57600 | 30 |
| 66240 | 35 |
| 74160 | 40 |
| 81600 | 45 |

The phase adjustment is sent to the loop filter 23 at step 706 which sends a signal to the digital signal synthesiser 24 to adjust the generated replica carrier signals accordingly.

The signals are iteratively adjusted until the phase error is less than a predetermined minimum threshold at step 707, in the preferred embodiment the predetermined minimum threshold is set to 0.5 degrees.

It is possible to use a sparse table to reduce the memory requirements by having index entries which are closer together for small phase difference and further apart for greater phase differences. In this way when the phase difference is greater, the phase adjustment applied is unlikely to result in a signal which matches the phase precisely, but that will be improved on further iterations.

Figure 9:
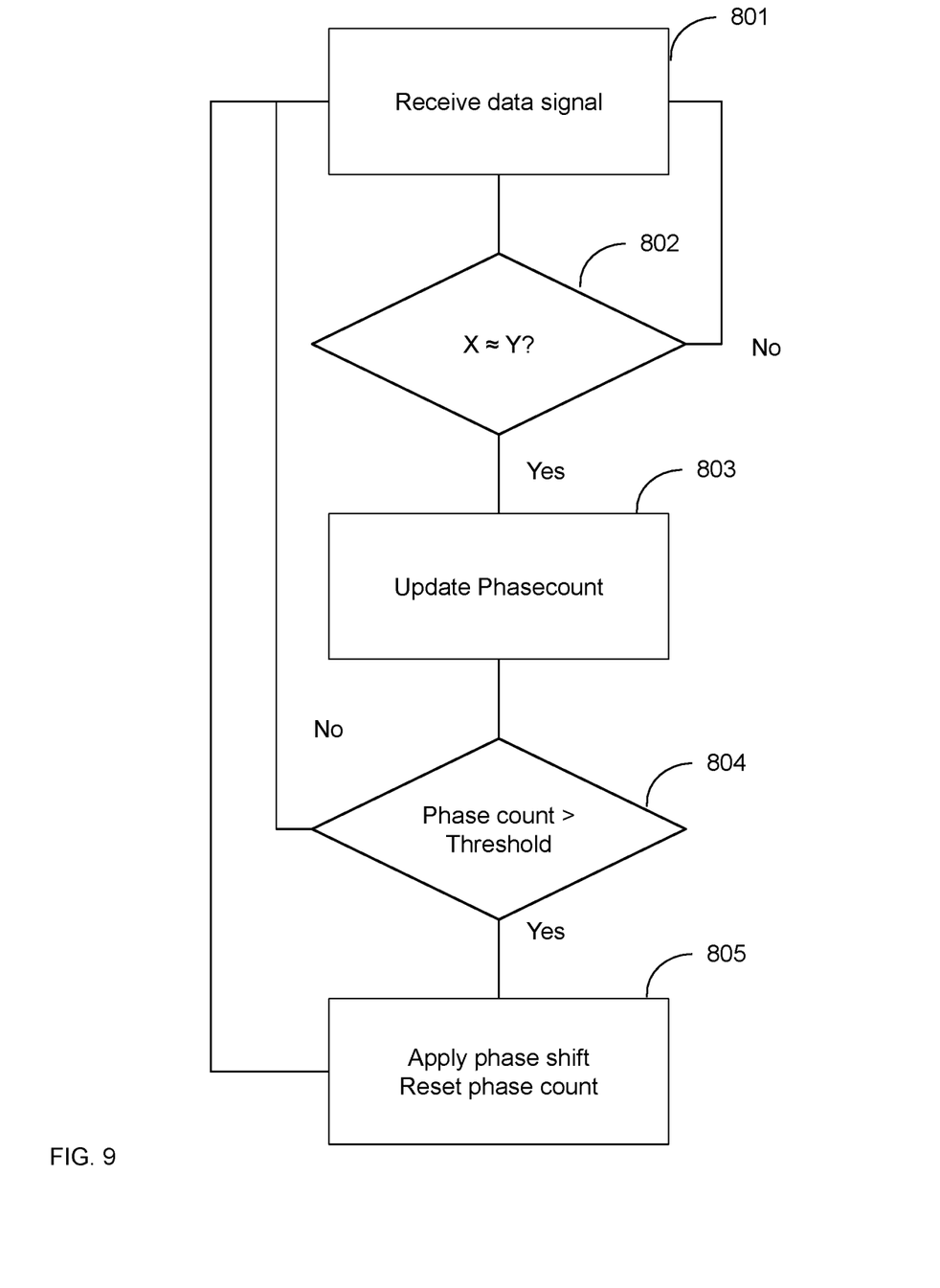
FIG. 9 is a flow chart illustrating a method for determining small phase adjustments to maintain frequency lock.

Because large temperature differences cause large frequency deviations a similar technique can be used to lock on to the transmitted carrier frequency. A method of maintaining frequency lock is illustrated in FIG. 9.

After achieving the phase lock the constellation will rotate (clock wise or anti clockwise) due to carrier frequency differences between the transmitter 111 and the receiver 121. This rotation and the direction of rotation can be monitored by measuring the symbols which should have equal observed X and Y values. When these symbols rotate, there will be a difference between the magnitudes of the X and Y components. By monitoring this difference over number of received symbols we can estimated the magnitude and direction of rotation.

The average difference between the magnitudes can be monitored. In a preferred embodiment a count of the polarity of the difference is maintained as follows:

If X is approximately equal to Y at step 802 then a phase count variable is updated at step 803 according to the following equation:

If $X>Y$ then $IQ\_PhaseCount=IQ\_PhaseCount-$'1';

Else $IQ\_PhaseCount=IQ\_PhaseCount+$'1';

End If;

In the preferred embodiment of the present invention the phase is adjusted by half a degree if the phase count becomes greater than a predetermined threshold which is preferably set to fifteen.

If the constellation is not rotating then the phase differences will fluctuate around zero and the phasecount variable will not exceed the predetermined threshold. In the event the threshold is exceeded at step 804 a small phase adjustment is applied and the phase count variable is reset to zero.

In different embodiments of the invention the magnitude of the phase adjustments may be set to 0.5, 1 or 2 degrees to counter that rotation.

This is a continuous process and dynamic frequency matching is achieved by adjusting the phase of the carrier.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognised that various alterations, modifications, and/or additions may be introduced into the constructions and arrangements of parts described above without departing from the scope of the present invention as defined in the following claims.

The invention claimed is:

1. A method of initializing a surface modem comprising a controller coupled to an analogue front end comprising a plurality of filter stages for receiving signals from a telemetry module, the method comprising the steps of:

repeating, for different frequencies across a channel bandwidth range, the steps of:
  receiving a signal of a known frequency; and
  processing said signal by determining a magnitude of the received signal at said known frequency;
until a plurality of signals have been received and processed;
calculating an optimum set of filter parameters in dependence upon the measured magnitudes at each known frequency and a predefined set of filter stage frequency responses; and
setting filter parameters of the analogue front end to said set of optimum filter parameters;
in which and if the magnitude of the received signal is less than a predetermined minimum, the method further comprises the steps of:
  applying a gain to the received signal; and
  reprocessing the signal to determine the magnitude of the signal at that frequency;
  wherein:
    applying the gain involves adjusting programmable gain amplifier (PGA) gain to increase the signal amplitude; and
    the gain to be applied is determined by indexing a preset PGA table.

2. The method according to claim 1, in which the magnitude of the received signal at each know frequency is determined by performing a Fast Fourier Transform.

3. The method according to claim 1, in which the bandwidth is adjusted prior to entering autotune mode.

4. The method according to claim 1, wherein a mean frequency magnitude is utilized in determining if the magnitude of the received signal is less than the predetermined minimum.

5. The method according to claim 1, wherein calculating the optimum set of filter parameters involves using a stored magnitude of the frequency and gain applied to determine at least one analogue filter setting to be applied by an analogue adaptive equalization control module for each filter stage.

6. The method according to claim 5, wherein the repeating step further comprises the step of:
  storing the magnitude of the frequency and gain applied in a results table.

7. The method according to claim 5, wherein setting the filter parameters of the analogue front end involves adjusting at least one adaptive frequency response (AFR) parameter.

8. The method according to claim 7, wherein setting the filter parameters of the analogue front end further involves adjusting bandwidth.

9. A surface modem for receiving signals from a telemetry module comprising a controller coupled to an analogue front end comprising a plurality of filter stages, in which the controller is arranged in operation to:

send a command to the telemetry module to enter autotune mode;
repeat, for different frequencies across a channel bandwidth range, the steps of:
  receiving a signal of a known frequency; and
  processing said signal by determining a magnitude of the received signal at said known frequency;
until a plurality of signals have been received and processed;
calculate an optimum set of filter parameters in dependence upon the measured magnitude at each known frequency and a predefined set of filter stage frequency responses; and
set filter parameters of the analogue front end to said set of optimum filter parameters;
in which and if the magnitude of the received signal at a known frequency is less than a predetermined minimum, the controller is arranged to perform the steps of:
  applying a gain to the received signal; and
  reprocessing the signal to determine the magnitude of the signal at said known frequency;
  wherein:
    applying the gain involves adjusting programmable gain amplifier (PGA) gain to increase the signal amplitude; and
    the gain to be applied is determined by indexing a preset PGA table.

10. The apparatus according to claim 9, in which the magnitude of the received signal at each know frequency is determined by performing a Fast Fourier Transform.

11. The apparatus according to claim 9, in which the bandwidth is adjusted prior to entering autotune mode.

12. The apparatus according to claim 9, wherein a mean frequency magnitude is utilized in determining if the magnitude of the received signal is less than the predetermined minimum.

13. The apparatus according to claim 9, wherein calculating the optimum set of filter parameters involves using a stored magnitude of the frequency and gain applied to determine at least one analogue filter setting to be applied by an analogue adaptive equalization control module for each filter stage.

14. The apparatus according to claim 13, wherein the repeating step further comprises the step of:
  storing the magnitude of the frequency and gain applied in a results table.

15. The apparatus according to claim 13, wherein setting the filter parameters of the analogue front end involves adjusting at least one adaptive frequency response (AFR) parameter.

16. The apparatus according to claim 15, wherein setting the filter parameters of the analogue front end further involves adjusting bandwidth.

* * * * *